United States Patent
Girlinger et al.

(10) Patent No.: US 8,602,321 B2
(45) Date of Patent: Dec. 10, 2013

(54) BALL VALVE WITH REDUCED EROSION BEHAVIOR

(75) Inventors: Gerhard Girlinger, Leonding (AT); Frank Traxel, Angelbachtal (DE); Roland Mitter, Linz (AT)

(73) Assignee: Robert Bosch GmbH, Stuttgart (DE)

( * ) Notice: Subject to any disclaimer, the term of this patent is extended or adjusted under 35 U.S.C. 154(b) by 721 days.

(21) Appl. No.: 12/525,131

(22) PCT Filed: Jan. 3, 2008

(86) PCT No.: PCT/EP2008/050039
§ 371 (c)(1),
(2), (4) Date: Dec. 16, 2009

(87) PCT Pub. No.: WO2008/092711
PCT Pub. Date: Aug. 7, 2008

(65) Prior Publication Data
US 2010/0116910 A1    May 13, 2010

(30) Foreign Application Priority Data
Jan. 30, 2007   (DE) .......................... 10 2007 004 553

(51) Int. Cl.
*F02M 41/16*    (2006.01)

(52) U.S. Cl.
USPC ............ 239/96; 239/88; 239/124; 239/585.1; 239/585.3; 239/900; 123/446; 123/467

(58) Field of Classification Search
USPC ............... 239/88, 96, 124, 127, 585.1, 585.3, 239/900; 123/446, 447, 467, 496
See application file for complete search history.

(56) References Cited

U.S. PATENT DOCUMENTS

| | | | |
|---|---|---|---|
| 4,707,278 A | | 11/1987 | Breyer et al. |
| 5,685,483 A | * | 11/1997 | Ganser ..................... 239/533.3 |
| 6,062,531 A | | 5/2000 | Rapp et al. |
| 6,247,452 B1 | | 6/2001 | Dittus et al. |
| 6,276,335 B1 | | 8/2001 | Egler et al. |
| 6,371,084 B1 | | 4/2002 | Betz |
| 6,378,502 B1 | | 4/2002 | Betz |
| 6,820,827 B1 | | 11/2004 | Boecking |
| 7,117,842 B2 | * | 10/2006 | Boehland et al. ............. 123/467 |
| 7,591,436 B2 | * | 9/2009 | Ganser ............................ 239/96 |
| 2003/0087487 A1 | | 5/2003 | Finke et al. |

FOREIGN PATENT DOCUMENTS

| | | |
|---|---|---|
| DE | 10152173 A1 | 4/2003 |
| JP | 36-7201 | 4/1961 |
| JP | 2000161178 | 6/2000 |
| JP | 2004036542 | 2/2004 |
| WO | 02/23036 | 3/2002 |
| WO | 2006029927 A1 | 3/2006 |

* cited by examiner

Primary Examiner — Steven J Ganey
(74) Attorney, Agent, or Firm — Michael Best & Friedrich LLP

(57) ABSTRACT

The invention relates to a ball valve for adjusting a flow of a fluid medium. The ball valve includes a valve seat and a rounded closing element, in particular a valve ball. Furthermore, the ball valve has an inlet with a choke valve and one diffuser arranged between the choke valve and the valve seat. The diffuser includes a constriction on the side facing the valve seat.

15 Claims, 3 Drawing Sheets

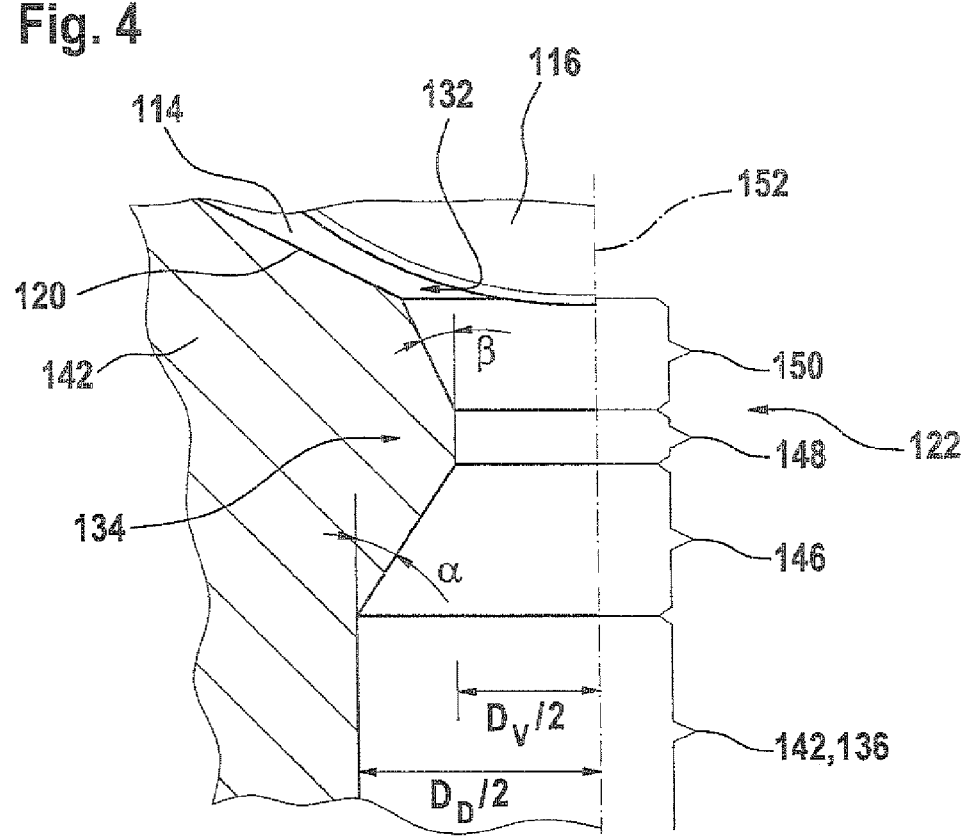

BALL VALVE WITH REDUCED EROSION BEHAVIOR

CROSS-REFERENCE TO RELATED APPLICATION

This application is a 35 USC 371 application of PCT/EP2008/050039 filed on Jan. 3, 2008.

BACKGROUND OF THE INVENTION

1. Field of the Invention

The invention is based on known ball seat valves for adjusting a flow of a fluid medium. Ball seat valves of this kind are used in many engineering fields in which it is necessary to adjust a flow of fluid media such as gases or liquids, for example in the field of hydraulic control units.

2. Description of the Prior Art

An important sample application for ball seat valves of this kind can be found in the field of automotive engineering, particularly in the field of injection technology. In numerous injection devices, ball seat valves are used for regulating hydraulic pressure and/or controlling the injection behavior of such systems. Primarily in the field of high-pressure reservoir injection systems (common rail systems), ball seat valves are used to control the lift of an injection valve closure member, which opens or closes injection openings. Examples of such devices are disclosed in DE 101 52 173 A1 and DE 196 50 865 A1. In them, a control chamber that directly or indirectly influences the lift of the injection valve closure member is connected to the ball seat valve directly via an inlet or through an additional bore. In addition to a valve ball, the ball seat valve has an actuator that presses the valve ball into a valve seat or lifts it away from the seat in order to disconnect or connect the control chamber from or to a relief chamber.

As is also demonstrated in DE 101 52 173 A1, for example, flow-adjusting ball seat valves known from the prior art generally have a choke valve on the side of the inlet oriented toward the control chamber. On its side oriented toward the ball seat valve, this choke valve is adjoined by one or more expansions of the inlet, which can assume various shapes.

In actual use, though, conventional ball seat valves known from the prior art have the disadvantage of a powerful erosion, particularly in the high-pressure reservoir injection systems functioning at pressures of several thousand bar. This erosion is in particular due to a cavitation in the choke valve, largely occurring outside the lift throttle limit. The expression "lift throttle limit" refers to the limit of the lift of the ball seat valve above which the flow no longer changes with a constant pressure upstream and downstream of the ball seat valve. As time passes, the above-described cavitation effects at the choke valve result in so-called cavitation erosion due to condensation, particularly in the seat region of the ball seat valve. As a result, a change occurs in the closing behavior of ball seat valves and this is accompanied by a change in the injection behavior of the injection device.

ADVANTAGES AND SUMMARY OF THE INVENTION

The present invention therefore proposes a ball seat valve for adjusting a flow of a fluid medium, as well as an injection device that includes a ball seat valve of this kind, both of which avoid the above-described disadvantages of the prior art. In particular, the proposed ball seat valve has a geometry, which sharply reduces cavitation erosion and with which cavitation erosion that occurs nevertheless does not damage the valve seat in a way that causes the latter to become leaky.

In order to optimize the ball seat valve geometry, simulation calculations were carried out that represent various parameters of the fluid medium at the ball seat valve, which parameters decisively affect cavitation erosion. In particular, these parameters are the pressure occurring in the fluid medium, the velocity of the fluid medium, the proportion of the vapor to the total volume of the fluid medium, and a mass transfer rate between the liquid phase and gaseous phase of the fluid medium.

In these simulation calculations, it has turned out that cavitation erosion can be sufficiently reduced if an (in particular high-pressure-side) inlet to the seat of the ball seat valve is used, which has a choke valve and a diffusor that adjoins the choke valve on the latter's end oriented toward the valve seat and has a constriction on the end oriented toward the valve seat. The term "diffusor" generally denotes the region between the choke valve and the valve seat.

This special form of the diffusor, with the constriction according to the invention by contrast with an (in particular step-shaped) expansion of the kind shown in DE 101 52 173 A1, yields a particular spatial curve of the above-mentioned parameters in the region of the valve seat, which avoids the occurrence of cavitation erosion. The presence of the constriction upstream of the valve seat diverts the flow of the fluid medium in such a way that it sharply reduces the risk of cavitation erosion in the region of the valve seat.

The bevel between the valve seat and the diffusor bore is generally referred to as the "Helget bevel". In the known valve seat geometries, a still water region occurs in the region of this Helget bevel, i.e. a region in which the flow detaches from the bore wall. A flow detachment of this kind, however, ends up producing a flow directed toward a wall, i.e. in particular, a velocity component of the flow that is oriented toward the wall. With the geometry according to the invention, however, no detachment of the flow of the fluid medium occurs or only a sharply reduced such detachment occurs. As a result, the flow oriented toward the wail in the Helget bevel is avoided or at least sharply reduced, i.e. velocity components perpendicular to the bore wall are sharply reduced or avoided entirely.

The new geometry in the Helget bevel beneath the valve seat also sharply reduces the proportion of the gaseous phase of the fluid medium in the vicinity of the wall. Consequently, in the vicinity of the wall in the region of the valve seat, there is no vapor component that could condense or there is only an insignificant amount of it. Consequently, the condensation rate is infinitesimally low in this region. Through this overall occurrence of a flow parallel to the walls as well as a low proportion of vapor and low condensation rate in the vicinity of the wall, the geometry according to the invention effectively avoids cavitation erosion.

The ball seat valve according to the invention and the injection device according to the invention consequently have a high long-term stability. The injection devices demonstrate a steady injection behavior and low leakage rates over long periods of use.

BRIEF DESCRIPTION OF THE DRAWINGS

Exemplary embodiments of the invention will be explained in greater detail in the description that follows in conjunction with the drawing, in which:

FIG. 4 shows a detailed depiction analogous to the one in FIG. 1B of the constriction in the region of the valve seat.

DESCRIPTION OF THE PREFERRED EMBODIMENTS

Figure 1A:
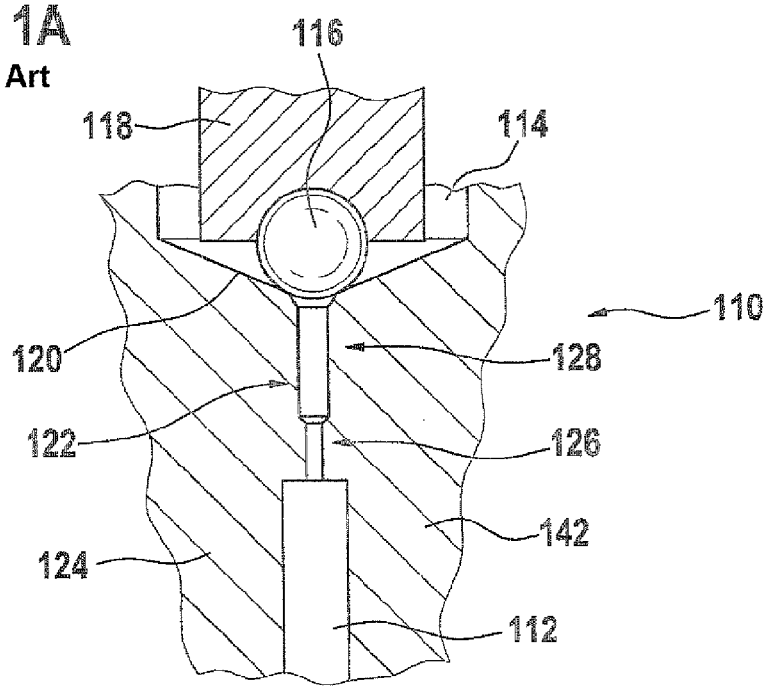
FIGS. 1A and 1B show inlet geometries of conventional ball seat valves.

FIG. 1A shows a ball seat valve 110 corresponding to the prior art, which corresponds for example to the device disclosed in DE 101 52 173 A1. This example of a ball seat valve 110 is a 2/2-way directional control valve, as are those that follow. Other embodiments, however, are also conceivable.

The ball seat valve 110 is used, for example, in an injection device and in it, serves to connect a bore 112 that communicates with a control chamber to a relief chamber 114 or to disconnect this bore from the relief chamber. To this end, a closure member 116, which in this case is a valve ball, is pressed into or lifted out of a conical valve seat 120 by means of an actuator 118. In lieu of a ball-shaped closure member 116, it is also possible to use other shapes of closure member, preferably rounded shapes, that are known to those skilled in the art.

The bore 112 in which a fuel pressure in the vicinity of 2000 bar can prevail, for example, communicates with the relief chamber 114 via an inlet 122 that is a component of the ball seat valve 110 and is embodied in the form of a bore in a valve body 124.

On its side oriented toward the bore 112, the inlet 122 first has a cylindrical choke valve 126 that is adjoined at its end oriented toward the valve seat 120 by a cylindrical diffusor 128. At the transition between the choke valve 126 and diffusor 128, a slight bevel is generally provided. The cross section of the choke valve 126 decisively influences and adjusts the flow through the ball seat valve 110 above the lift throttle limit.

The actuator 118 can, for example as shown in DE 196 50 865 A1, be a solenoid armature with which the position of closure element 116 is selectively adjusted by means of an electromagnet. It is, however, also possible to use other types of actuators.

Figure 1B:
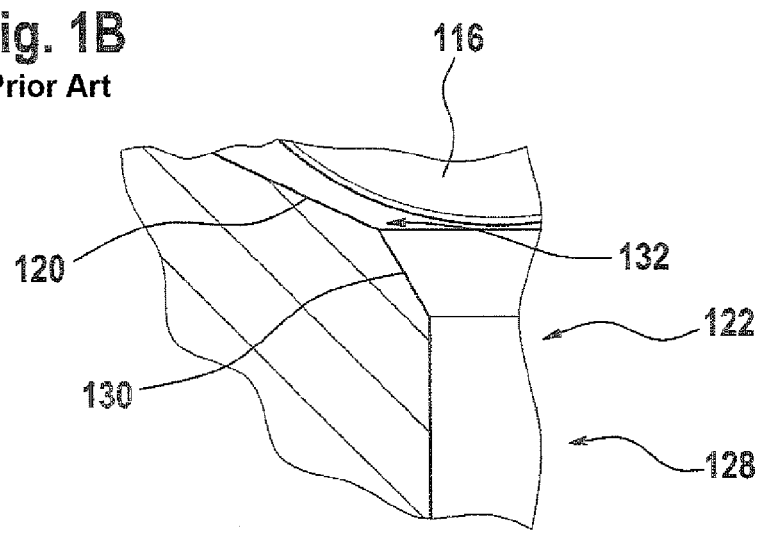

FIG. 1B is an enlarged, detailed depiction of the transition from the inlet 122 to the valve seat 120 when the valve is in the open position. The drawing shows that at this transition, the inlet 122, as is likewise proposed in DE 101 52 173 A1, for example, has a conical expansion.

As described above, various simulation calculations were carried out in order, through simulation, to determine the above-mentioned critical parameters in the region of this transition. It turned out that in the sealing region 132 in which the closure member 116 rests against the sealing seat 120 in the closed state, which region is especially critical for the sealing behavior of the ball seat valve 110, with the embodiment corresponding to the prior art shown in FIGS. 1A and 1B, velocities in the range from approx. 200 to 400 m/s occurred between the relief chamber 114 and the bore 112 with pressure differences that are realistic for injection devices. In relation to the wall of the valve body 124, these velocities were oriented at angles in the range from 30 to 45°.

Furthermore, this particularly critical region turned out to have a proportion of vapor to the total volume of up to 0.7 to 0.8 (the simulations were carried out predominantly for diesel fuel). In addition, the mass transfer rate from the vapor phase into the liquid phase in this sealing region 132 was comparatively high and assumed values of up to approx. 30,000 kg/ (s·m$^3$) (depending on the operating point). As described above, these high velocity components perpendicular to the wall of the valve body 124, the high condensation-prone vapor components, and the high mass transfer rate lead to cavitation erosion in the sealing region.

Figure 2:
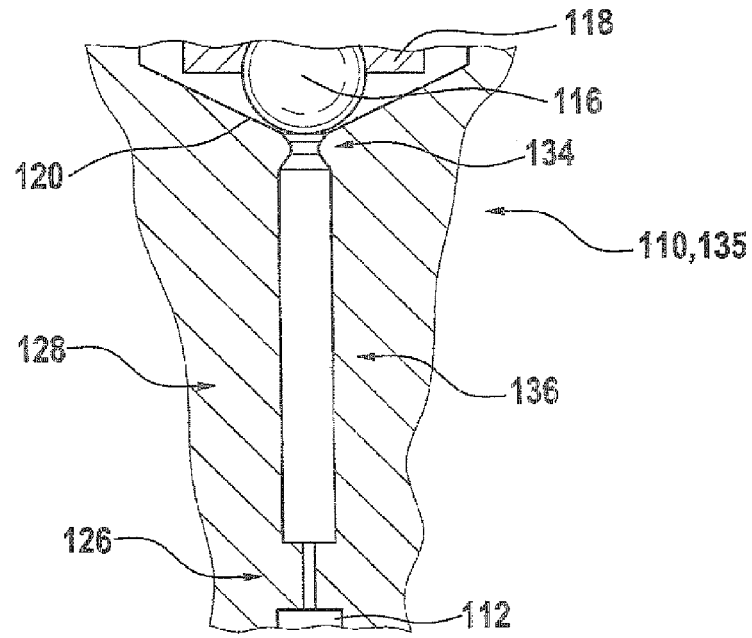
FIG. 2 shows an exemplary embodiment of a ball seat valve according to the invention, with a cylindrical diffusor.
Figure 3:
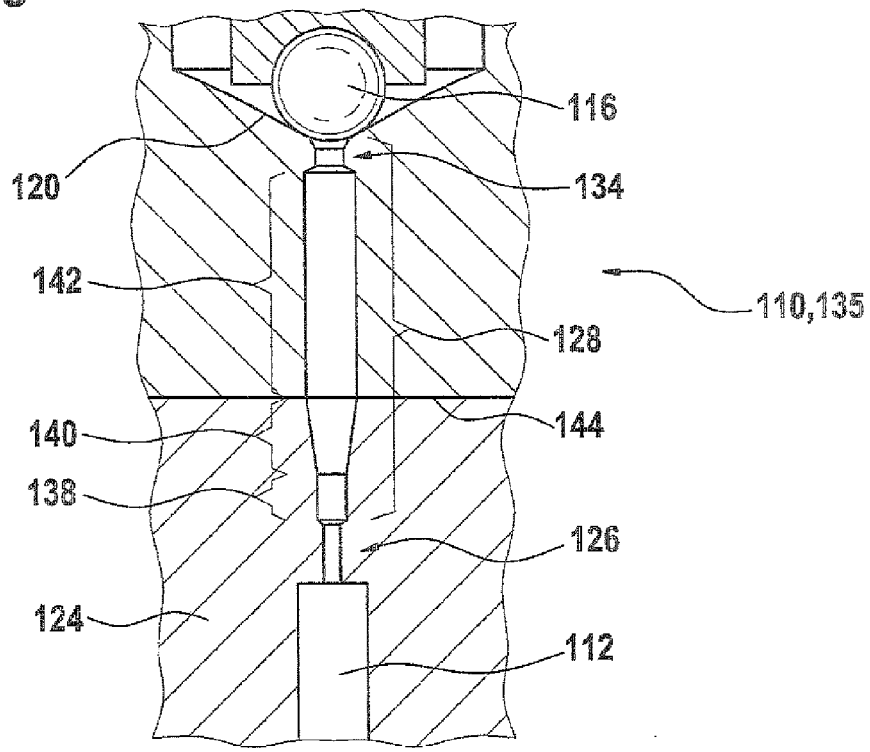
FIG. 3 shows an exemplary embodiment alternative to the one in FIG. 2, with a conical diffusor.

By contrast, FIGS. 2 and 3 show embodiments of ball seat valves 110 according to the invention, which can be used, for example, in a fuel injection device 135 according to the invention, for example a common rail injector. These ball seat valves 110 likewise have an inlet (as in the prior art), whose end connected to the bore 112 has a choke valve 126.

As in the exemplary embodiment according to FIG. 1A, the end of the choke valve 126 oriented toward the valve seat 120 is adjoined by the diffusor 128, FIGS. 2 and 3 show different embodiments of this diffusor 128; in any case, though, this diffusor has a constriction 134 at its end oriented toward the valve seat 120.

In the exemplary embodiment shown in FIG. 2, the diffusor 128 between the choke valve 126 and the constriction 134 is embodied in the form of an essentially continuous cylindrical diffusor section 136. In the exemplary embodiment shown in FIG. 3, however, the diffusor 128 between the choke valve 126 and the constriction 134 is essentially divided into three subsections: a first cylindrical diffusor section 138 that adjoins the choke valve 126, a conical diffusor section 140 that widens out in the direction toward the valve seat 120, and a second cylindrical diffusor section 142 that extends upward to the constriction 134.

In the embodiment shown in FIG. 3 in which the diffusor 128 is equipped with the conical diffusor section 140, an optional parting line 144 is also provided in the valve body 124 between the conical diffusor section 140 and the second cylindrical diffusor section 142. This parting line 144 divides two structural units of the injection device 135, which can be attached to each other, for example, by means of an external clamping nut that is not shown in FIG. 3. This parting line 144 simplifies the production of the diffusor 128 considerably because in this case, the first cylindrical diffusor section 138 and the conical diffusor section 140, for example, can be jointly produced by being drilled from above.

In a fashion analogous to FIG. 1B, FIG. 4 shows a detailed view of the transition between the inlet 122 and the relief chamber 114 for the exemplary embodiment of the ball seat valve 110 with the constriction 134 depicted in FIG. 2 or 3. As is clear from FIG. 4, the constriction 134 is composed of three parts: the cylindrical diffusor section 136 or 142 (depending on whether one is considering the exemplary embodiment according to FIG. 2 or FIG. 3) is adjoined by a first conical constriction section 146, followed by a cylindrical constriction section 148, and finally a second conical constriction section 150.

The first conical constriction section 146 is embodied so that in this region, the wall of the valve body 124 and the inlet axis 152 enclose an angle α between 20° and 80°, preferably between 25° and 65°. In the second conical constriction section 150, the wall of the valve body 124 and the inlet axis 152 analogously enclose an angle β that lies in the same angular range.

The length of the individual constriction sections 146, 148, 150 can be selected from within a broad range. In this exemplary embodiment, the length of the cylindrical constriction section 148 is approximately 15% of the total length of the constriction 134 and the length of the first conical constriction section 146 is approximately 50% of it. Other embodiments are also possible, however, particularly deviations from the above-mentioned allocation of lengths by up to a factor of 3, for example. Furthermore, by contrast with the embodiments shown here with the abrupt transition between the cylindrical and conical constriction sections, it is also possible for rounded transitions to be provided.

For the total length of the constriction 134 in the direction of the inlet axis 152, i.e. the sum of the constriction sections 146, 148, and 150, dimensions in the range of greater than 0% and less than 100% (for example between 30% and 80% or between 45% and 70%), and in particular between 0% and 50% of the maximum cross section of the diffusor have turned out to be well-suited.

In this exemplary embodiment, the constriction 134 has its narrowest diameter $D_V$ in the region of the cylindrical constriction section 148. This constriction diameter $D_V$ is preferably in a range between 30 and 70%, particularly preferably between 40 and 60%, especially between 55 and 60% of the maximum diameter of the diffusor 128. This maximum diameter of the diffusor 128 is labeled $D_D$ in FIG. 4 and in this exemplary embodiment, is the diameter of the second cylindrical diffusor section 142 (exemplary embodiment in FIG. 3) or the diameter of the cylindrical diffusor section 136 (exemplary embodiment according to FIG. 2). At typical pressure differences in injection devices 135, this selection of the constriction 134 has yielded embodiments with extremely low cavitation erosion.

Simulation calculations for determining the above-mentioned parameters that characterize the flow and cavitation erosion were also carried out for the exemplary embodiment shown in FIG. 4. These simulation calculations demonstrated a significant improvement of the values in comparison to the embodiment according to the prior art shown in FIG. 1B.

It has thus turned out that in the sealing region, in particular in the region in which the closure member 116 rests in the valve seat 120 when the ball seat valve 110 is closed, velocities of less than 200 m/s occur, with the flow traveling parallel to the wall of the valve body 124 in a practically continuous fashion, which once again has a decisive affect on cavitation erosion. On top of this, the volume fraction of the gaseous phase of the fluid medium (once again calculated based on diesel fuel) was significantly reduced in comparison to the results in FIG. 1B and yielded values of less than 0.2. In addition, the above-described mass transfer rate from the vapor phase into the liquid phase, i.e. the condensation behavior, which is a main reason that cavitation erosion occurs, was significantly reduced and was below 10,000 kg/(s·m$^3$) in the critical sealing region 132.

These results demonstrate that the constriction 134 according to the invention achieves the above-described effect of reducing cavitation erosion and leads to a significant improvement in the long-term stability of the claimed ball seat valves 110.

The foregoing relates to the preferred exemplary embodiments of the invention, it being understood that other variants and embodiments thereof are possible within the spirit and scope of the invention, the latter being defined by the appended claims.

The invention claimed is:

1. A ball seat valve for adjusting a flow of a fluid medium, comprising:
 a valve seat;
 a rounded ball-shaped closure member for the valve seat;
 an inlet with a choke valve;
 a diffusor situated between the choke valve and the valve seat, wherein the diffusor has a constriction at its end oriented toward the valve seat, and wherein the constriction has a reduction of a cross section of the inlet, relative to a maximum cross section of the diffusor, of 30 to 70%; wherein the diffusor has a cylindrical diffusor section upstream of the constriction and a conical diffuser section upstream of the constriction, and wherein the ball seat valve has a valve body with a parting line that extends through the valve body at a transition between the cylindrical diffusor section and the conical diffusor section to divide the valve body into two units.

2. The ball seat valve as recited in claim 1, wherein the constriction has a length along an inlet axis of between 0% and 50% of the maximum cross section of the diffusor.

3. The ball seat valve as recited in claim 2, wherein the constriction has a conical constriction section at its end oriented away from the valve seat.

4. The ball seat valve as recited in claim 3, wherein the conical constriction section has a bore angle of between 20° and 80° in relation to an inlet axis.

5. The ball seat valve as recited in claim 1, wherein the constriction has a conical constriction section at its end oriented away from the valve seat.

6. The ball seat valve as recited in claim 5, wherein the conical constriction section has a bore angle of between 20° and 80° in relation to an inlet axis.

7. The ball seat valve as recited in claim 6, wherein the constriction also has a cylindrical constriction section between the conical constriction section and the valve seat.

8. The ball seat valve as recited in claim 7, wherein the constriction also has a second conical constriction section between the cylindrical constriction section and the valve seat.

9. The ball seat valve as recited in claim 5, wherein the constriction also has a cylindrical constriction section between the conical constriction section and the valve seat.

10. The ball seat valve as recited in claim 9, wherein the constriction also has a second conical constriction section between the cylindrical constriction section and the valve seat.

11. A ball seat valve for adjusting a flow of a fluid medium, comprising:
 a valve seat;
 a rounded ball-shaped closure member for the valve seat;
 an inlet with a choke valve;
 a diffusor situated between the choke valve and the valve seat, wherein the diffusor has a constriction at its end oriented toward the valve seat and extending to the valve seat, and wherein the constriction has a length along an inlet axis of between 0% and 50% of a maximum cross section of the diffusor.

12. The ball seat valve as recited in claim 11, wherein the constriction has a conical constriction section at its end oriented away from the valve seat.

13. The ball seat valve as recited in claim 12, wherein the conical constriction section has a bore angle of between 20° and 80° in relation to an inlet axis.

14. The ball seat valve as recited in claim 12, wherein the constriction has a cylindrical section between the conical section and the valve seat.

15. A ball seat valve for adjusting a flow of a fluid medium, comprising:
 a valve seat;
 a rounded ball-shaped closure member for the valve seat;
 an inlet with a choke valve;
 a diffuser situated between the choke valve and the valve seat, wherein the diffuser has a constriction at its end oriented toward the valve seat, and wherein the constriction has a reduction of a cross section of the inlet, relative to a maximum cross section of the diffuser, of 30% to 70%;

wherein the constriction has a conical constriction section at its end oriented away from the valve seat, and wherein the constriction also has a cylindrical constriction section between the conical constriction section and the valve seat, the cylindrical constriction section having a length of between 5% and 45% of the total length of the constriction.

\* \* \* \* \*

UNITED STATES PATENT AND TRADEMARK OFFICE
CERTIFICATE OF CORRECTION

PATENT NO.       : 8,602,321 B2  
APPLICATION NO.  : 12/525131  
DATED            : December 10, 2013  
INVENTOR(S)      : Girlinger et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 962 days.

Signed and Sealed this
Twenty-second Day of September, 2015

Michelle K. Lee
*Director of the United States Patent and Trademark Office*